United States Patent [19]
Palmer et al.

[11] Patent Number: 5,264,031
[45] Date of Patent: Nov. 23, 1993

[54] PARTICULATE OPACIFYING EXTENDER FOR POLYMER COATINGS

[75] Inventors: Bruce P. Palmer, Edmond, Okla.; Penelope Stamatakis, Aurora, Ill.

[73] Assignee: Kerr-McGee Chemical Corporation, Oklahoma City, Okla.

[21] Appl. No.: 999,382

[22] Filed: Feb. 23, 1993

Related U.S. Application Data

[62] Division of Ser. No. 811,746, Dec. 23, 1991, abandoned.

[51] Int. Cl.[5] .................... C01B 17/00; C09G 1/00
[52] U.S. Cl. ............................ 106/401; 106/18.34; 106/287.32; 106/400; 423/511; 423/566.1; 423/567.1
[58] Field of Search ........... 106/400, 401, 420, 287.32, 106/18.34; 423/511, 567 R, 566.1

[56] References Cited

U.S. PATENT DOCUMENTS

| | | | |
|---|---|---|---|
| 2,063,835 | 12/1936 | Billson | 524/324 |
| 3,222,301 | 12/1965 | Dahm | 521/120 |
| 3,228,909 | 1/1966 | Oddo | 524/80 |
| 3,311,587 | 3/1967 | Fox | 524/80 |
| 3,450,667 | 6/1969 | Kopacki | 524/80 |
| 4,240,949 | 12/1980 | Ecker | 524/80 |
| 4,278,510 | 7/1981 | Chien et al. | 205/158 |
| 4,537,922 | 8/1985 | Chang et al. | 524/82 |

FOREIGN PATENT DOCUMENTS 924835 4/1973 Canada.

*Primary Examiner*—Karl Group
*Assistant Examiner*—Scott L. Hertzog
*Attorney, Agent, or Firm*—Herbert M. Hanegan

[57] ABSTRACT

A colloidal sulfur particle opacifying extender scatters light across the visible spectrum to result in an overall colorless appearance. A process for opacifying and extending a matrix which can be a water-borne emulsion or a coating, using the colloidal sulfur particles, and opacified and extended water-borne emulsions and coatings including the colloidal sulfur particles are also provided.

11 Claims, 3 Drawing Sheets

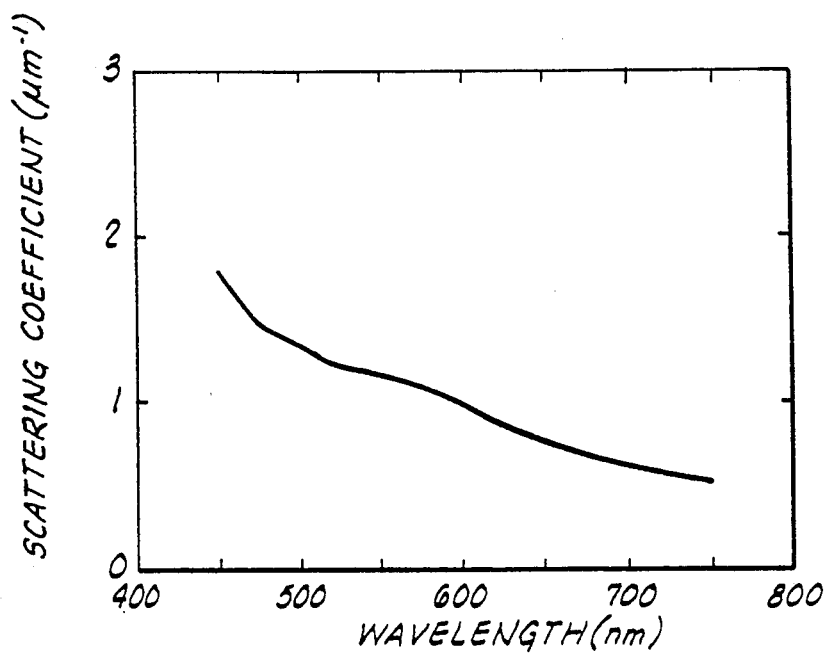
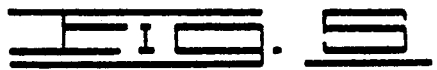
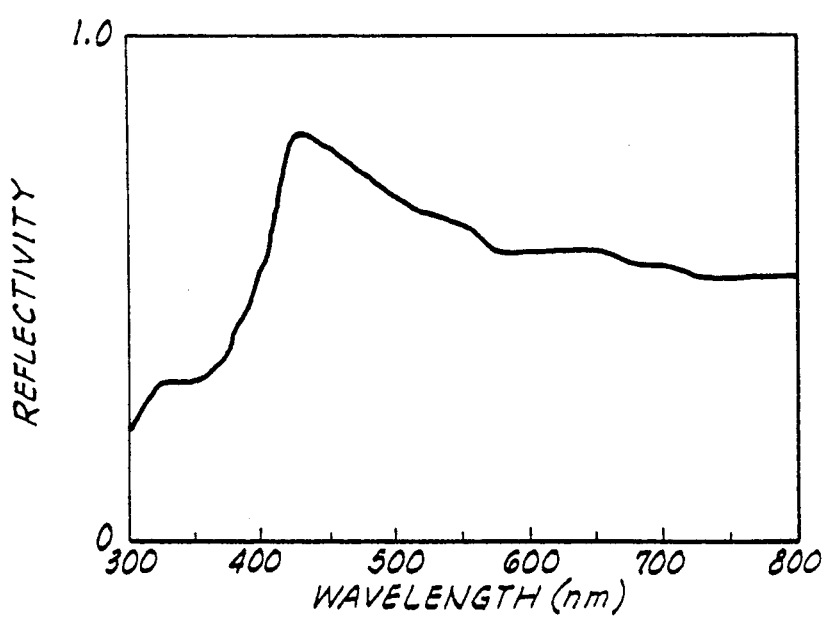
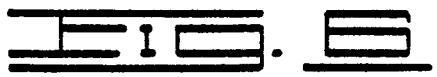

PARTICULATE OPACIFYING EXTENDER FOR POLYMER COATINGS

This application is a division of application Ser. No. 07/811,746, filed on Dec. 23, 1991, abandoned.

BACKGROUND OF THE INVENTION

1. Field of the Invention

The invention relates to opacifying particularly, to sulfur particle opacifying extenders more polymers and polymer coatings derived from water-borne emulsions.

2. Description of the Prior Art

A currently used opacifying extender for coating, water-borne emulsion compositions and the like is comprised of spherical particles consisting of a polymer shell surrounding an inner air bubble which typically has an outer diameter of about 0.4 μm and a core diameter of about 0.27 μm. Such an extender is produced by Rohm and Haas under the product name ROPAQUE™.

The opacity of such extender particles can be calculated by modeling them as spherical air bubbles, having a refractive index of 1.0 dispersed in a polymer matrix with refractive index of approximately 1.55. The results are shown in FIG. 1. A maximum opacity of about 0.015 $\mu m^{-1}$ for the matrix containing the extender is achieved for particles having a diameter of approximately 0.2 μm.

This model relates opacity of particles dispersed in a matrix to particle diameter, particle refractive index and matrix refractive index and can be applied to generate contours of constant opacity as a function of opacifying extender particle diameter and refractive index for spherical particles dispersed in a polymer matrix having a fixed refractive index of 1.55. The results of such calculations, as shown in FIG. 2, indicate that particles having a refractive index approximately equal to about 2.0 and a particle diameter in the range of from about 0.05 to about 1.00 μm exhibit an opacity of about 0.015 $\mu m^{-1}$ when included in a matrix of refractive index 1.55, such as the polymer film which remains when the water of a water-based paint emulsion evaporates, an opacity comparable to commercially available microvoid extenders. Opacity is defined by the relationship $O_p = 1/f^* h^*$ wherein $f^*$ and $h^*$ respectively represent the total particle volume per unit volume of film and the film thickness for which the luminous reflectance, $R_{lum}$, has a value of 0.98 which represents a luminous reflectance indistinguishable to the human eye from the luminous reflectance of an infinitely thick suspension of non-absorbing particles having an $R_{lum}$ of one. The luminous reflectance over a range of wavelengths $\lambda_1$ to $\lambda_2$ depends upon r, the particle radius; $n_p$, the particle refractive index (no absorption assumed) and $n_m$, the refractive index of the medium as given by the following equations $$R_{lum}(r, fh) = \frac{\int_{\lambda_1}^{\lambda_2} R(r, \lambda, n_p, n_m, fh) I(\lambda) K(\lambda) d\lambda}{\int_{\lambda_1}^{\lambda_2} I(\lambda) K(\lambda) d\lambda} \quad (1)$$

$$R(r, \lambda, n_p, n_m, fh) = \frac{s(r, \lambda, n_p, n_m) fh}{2 + s(r, \lambda, n_p, n_m) fh} \quad (2)$$

wherein $I(\lambda)$ is the special irradiance, $K(\lambda)$ is the luminous efficiency of the eye using simple two-stream radiative transfer theory, and R is the monochromatic reflectance given by equation (2). The scattering coefficient s is given by:

$$s = \left(\frac{C_{sca}}{V}\right)(1 - g) \quad (3)$$

wherein the terms $$\left(\frac{C_{sca}}{V}\right)$$

and g are the scattering cross section per unit particle volume and mean cosine of the scattering angle, respectively, as calculated by a computer program given in Appendix A of "Absorption and Scattering of Light by Small Particles", C.F Bohren and D.R. Huffman, John Wiley and Sons, New York, 1983, the content of which is herein incorporated by reference.

While the currently used opacifying extenders can successfully achieve desired results, they are generally expensive and require close particle size control to retain the required opacity. Thus, there is a need for a relatively less expensive opacifying extender requiring less rigorous particle size control.

SUMMARY OF THE INVENTION

In one aspect of the present invention, an opacifying extender for a matrix such as a polymer coating derived from a water-borne emulsion is provided comprised of colloidal sulfur particles.

The colloidal sulfur particles can be characterized by an opacity, as already defined, determined by the matrix refractive index measured at a wavelength of 550 nm of approximately 1.55 and the particle refractive index and diameter, in the range of from about 1.9 to about 2.3 and from about 0.10 μm to about 1.0 μm, respectively.

The sulfur particles, which themselves can have biocidal properties, can further include a biocide, e.g., a transition metal sulfide, to protect the particles from attack by biological organisms and may be coated with silica to retard chemical oxidation or photo-oxidation. A surfactant, e.g., ethoxylated compounds, carboxylates, sulfonates and sulfates, polyglycol ethers, amines, salts of acrylic acid, pyrophosphate and others can be added to aid dispersal of the particles in an aqueous matrix.

In another aspect of the present invention, a process for opacifying and extending a matrix is provided. The process includes opacifying and extending the matrix by dispersing the above described colloidal sulfur particles therein. The matrix can be a water-borne emulsion including a polymer and a water or aqueous component or a polymer coating produced when the water component is removed from the water-borne emulsion. The refractive index of the polymer component of the water-borne emulsion is in the range of from about 1.2 to about 1.7.

In yet another aspect of the invention, opacified coatings and water-borne emulsions are provided. The opacified and extended emulsions and coatings further include a polymer component and the above described colloidal sulfur particles dispersed therein in an amount in the range of from about 1% to about 40% by volume of the coating.

It is, therefore, a general object of this invention to provide an economical colloidal sulfur particle opacifying extender requiring less stringent control over particle size than heretofore used extenders.

A further object of this invention is to provide a process for opacifying a matrix such as a water-borne emulsion or a coating derived from a water-borne emulsion using colloidal sulfur particles.

Another object of the present invention is the provision of water-borne emulsions and coatings derived from water borne emulsions including colloidal sulfur particle opacifying extenders.

Other and further objects, features and advantages of the present invention will be readily apparent to those skilled in the art upon reading the description of preferred embodiments which follows.

BRIEF DESCRIPTION OF THE DRAWINGS

FIG. 5 is a graph showing the scattering coefficient as a function of wavelength for colloidal sulfur particles exhibiting the refractive index dependence on incident wave-length characteristic of orthorhombic ($\alpha$) sulfur as shown in FIG. 3.

FIG. 6 is a graph showing the reflectivity of a water-based suspension of colloidal sulfur as a function of wave-length.

DESCRIPTION OF PREFERRED EMBODIMENTS

Figure 1:
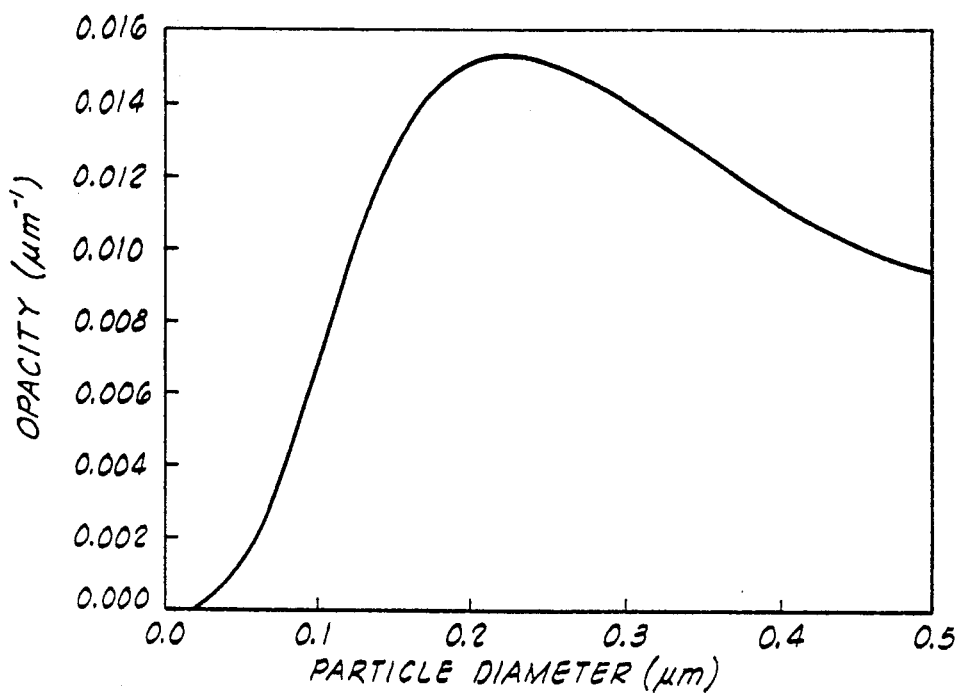
FIG. 1 is a graph showing the opacity of air bubbles dispersed in a polymer matrix having a refractive index of 1.55 as a function of particle diameter.
Figure 2:
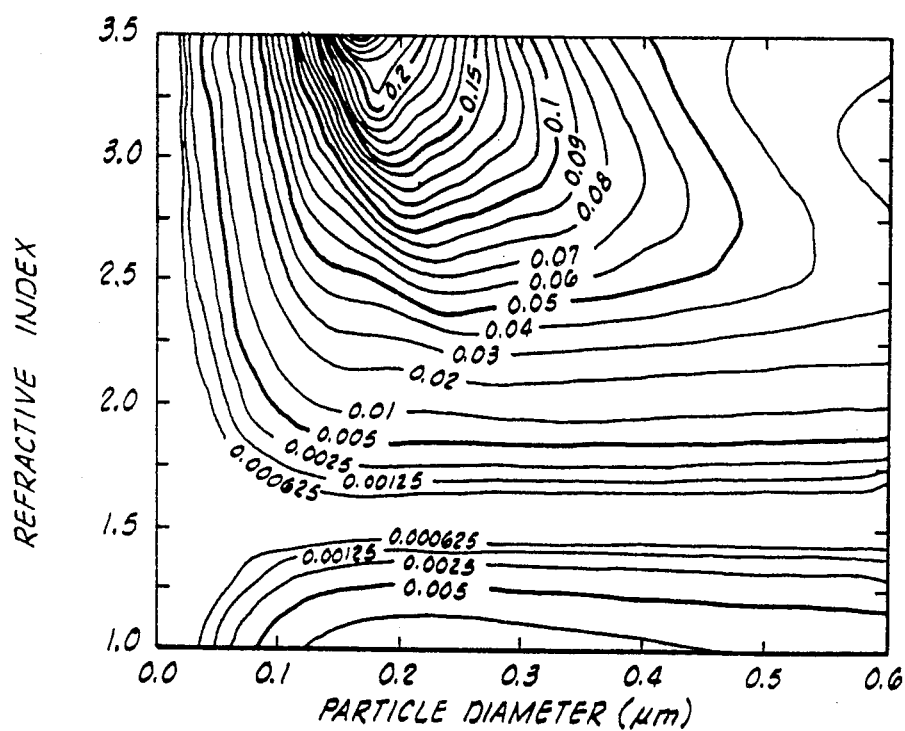
FIG. 2 is a graph showing the opacity of spherical particles as a function of particle diameter and refractive index when dispersed in a matrix having a refractive index of 1.55.

As used in this application, an "opacifying and extending process" refers to a process for making a matrix opaque, i.e., not transparent, and for extending or increasing the volume of the matrix in the same fashion as achieved by an inert filler, while providing other desired properties. An "opacifying extender" acts to opacify and extend a matrix. "Opacity" is defined as "the optical density of material, usually a pigment; the opposite of transparency", (N. Irving Sax and Richard J. Lewis, Sr., *Hawley's Condensed Chemical Dictionary*, Eleventh Edition, Van Nostrand Reinhold Company, New York 1987) and by the foregoing equations 1-3. Opacity refers to the ability of a pigment or paint to conceal another tint or shade which it covers. Opacity depends on the refractive index and size of the opacifying extender particles and the refractive index of the matrix wherein they are dispersed as already described. The terms "matrix" and "matrices" are used herein to mean the vehicle(s) in which the colloidal sulfur particle opacifying extenders are dispersed, e.g., the water-borne emulsion and the coating described hereinbelow. A colloidal particle is defined as a particle less than 1.0 $\mu$m in diameter.

This invention provides an opacifying extender comprised of colloidal sulfur particles, a process for opacifying and extending a matrix with colloidal sulfur particles and water-borne emulsion compositions and coating compositions derived from water-borne emulsions containing the colloidal sulfur particles.

The colloidal sulfur particles may be characterized by a refractive index measured at a wavelength of 550 nm in the range of from about 1.9 to about 2.3, more preferably from about 1.9 to about 2.1 and most preferably from about 1.9 to about 2.0, and by a size in the range of from about 0.15 $\mu$m to 1.0 $\mu$m. The colloidal sulfur particles may be in the orthorhombic ($\alpha$), monoclinic ($\beta$) or amorphous ($\gamma$) phases or may be a mixture of all three of these phases to insure that they have the required refractive index. The amorphous ($\gamma$) phase is preferred. Colloidal sulfur particle diameters may be optimized to scatter light across the visible spectrum resulting in an overall colorless appearance so that when they are used as an opacifier and extender in a matrix they produce a substantially colorless opacified and extended matrix. The colloidal sulfur particles may range in diameter from about 0.10 $\mu$m to about 1.05 $\mu$m, more preferably from about 0.1 $\mu$m to about 0.6 $\mu$m and most preferably from about 0.1 $\mu$m to about 0.5 $\mu$m.

The colloidal sulfur particle opacifying extender can be used with a metal sulfide such as zinc sulfide to protect the sulfur particles from attack by biological organisms. Other biocides include mercury compounds. Biocides are added to the matrix wherein the sulfur particles are dispersed. The sulfur particles can themselves possess some biocidal activity. Zinc sulfide can also be incorporated into the sulfur particles during their production.

The colloidal sulfur particles can include a silica coating to retard oxidation. Silica can be precipitated onto the sulfur particles from sodium silicate in aqueous solution by adjusting the pH to below 10 using a mineral acid such as sulfuric acid, and is a technique known to those skilled in the art.

Figure 3:
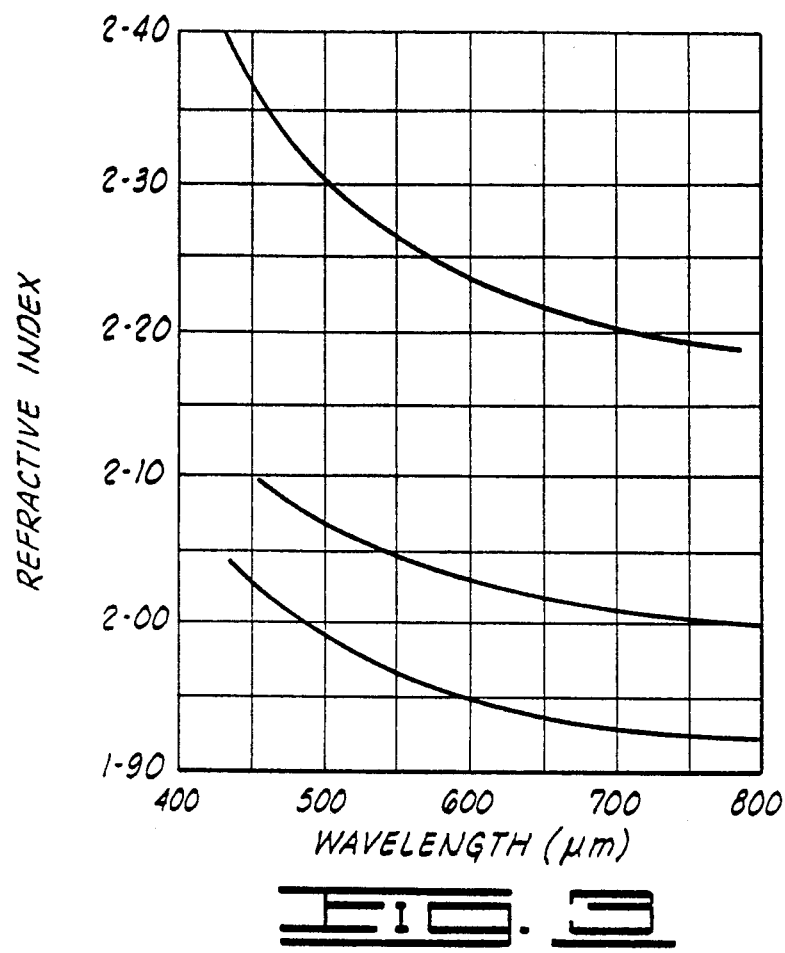
FIG. 3 is a graph showing the refractive index of sulfur in its several allotropic modifications as a function of wave-length.

Sulfur exists as an elemental solid in three allotropes: orthorhombic ($\alpha$), monoclinic ($\beta$), and amorphous ($\gamma$). All allotropes contain $S_8$ units, but have different lattice structures. Orthorhombic ($\alpha$) sulfur is the most stable allotrope at room temperature. FIG. 3 shows the refractive indices of these allotropes as a function of varying wavelength.

Figure 4:
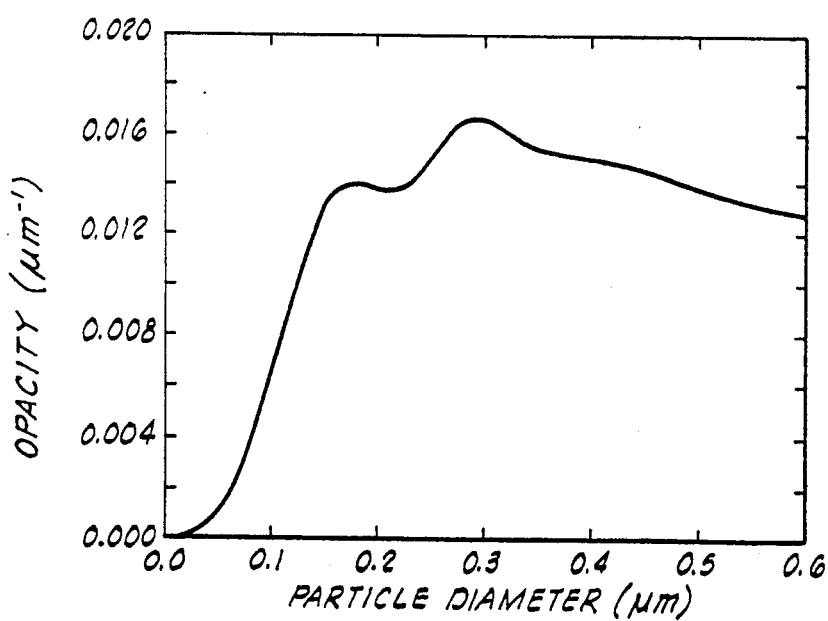
FIG. 4 is a graph showing the opacity of sulfur having a refractive index of 2.04 as a function of particle diameter when dispersed in a matrix having a refractive index of 1.55.

The opacity of sulfur particles having a refractive index of 2.04 measured at a wavelength of 550 nm in a medium of refractive index 1.55 is shown as a function of particle diameter in FIG. 4. It is clear from examination of FIG. 1 and FIG. 4 that the opacity of the sulfur particles over this particle diameter range is approximately equal to the opacity of an air bubble microvoid extender as shown in FIG. 1. Furthermore, for sulfur particles, peak opacity occurs over a range of particle diameters in a range of from about 0.10 $\mu$m to about 1.0 $\mu$m as compared with a peak opacity particle diameter range of from about 0.1 $\mu$m to about 0.5 $\mu$m for air bubble microvoid extenders. Thus, particle size control is not as important for sulfur particles as for microvoid extenders and the like.

Normally, sulfur has a yellow color; however, fine particles scatter light broadly across the visible spectrum resulting in an overall colorless appearance for the particles.

FIG. 5 shows the calculated scattering coefficient of orthorhombic ($\alpha$) sulfur particles of 0.3 $\mu$m diameter dispersed in a polymer resin such as would remain when water evaporates from a water-borne latex paint composition and having refractive index 1.55 as a function of wavelength. The wavelength dependence of the refractive index of orthorhombic (α) sulfur used in these calculations was taken from FIG. 3. The refractive index of sulfur as shown in FIG. 3 rises at the short wavelength blue region of the spectrum and causes particles to be more effective light scatterers. The scattering coefficient increases at the blue end of the spectrum as shown in FIG. 5 which is consistent with experimental measurements of reflectivity behavior such as those shown in FIG. 6.

A sample of colloidal sulfur was prepared by acidifying 0.10M $Na_2S_2O_3$ with 0.14M $H_3PO_4$. Particles of approximately 0.3 μm were allowed to settle out and their reflectivity was measured as a function of wavelength. The results of the reflectivity measurements are shown in FIG. 6 and clearly indicate that reflectivity rises toward the blue end of the spectrum.

According to the process for opacifying a matrix, colloidal sulfur particles having the characteristics already described are dispersed in a water-based emulsion, specifically one containing latex particles, other opacifiers such as $TiO_2$, other extenders such as clay, biocides, dispersants, and mildewcides, as well-known in the art. The sulfur particles are dispersed in the emulsion in an amount in the range of from about 1% to about 40%, more preferably from about 5% to about 35% and most preferably from about 10% to about 30% by volume of the resulting emulsion to result in an opacity as described above. A conventional opacifier such as is present $TiO_2$ 1–20% by volume in typical paint film. A coating such as silica can be applied to the particles to protect them against long-term chemical oxidation or photo-oxidation.

Thus, the process of the present invention for opacifying and extending a matrix broadly comprises dispersing colloidal sulfur particles in the emulsion. The particles are dispersed in the emulsion using conventional techniques such as mechanical dispersion. A surfactant can be added to the water-borne emulsion to aid dispersal of the sulfur particles. Suitable dispersants are an ethoxylated compound such as ethoxylated alkylphenol, nonyl phenoxypoly(ethylene oxide) ethanol, ethylene oxide-oleic acid adduct, ethoxylated nonylphenol and GAF IGEPAL CO-990 ™ and CO-660 ™; a carboxylate such as a potassium oleate, and a fatty acid monoglyceride; a sulfonate or sulfate such as sodium alkyl sulfonate, sodium napthalenesulfonate, calcium ligninsulfonate, sodium ligninsulfonate, sodium dodecylsulfate and poly(sodium styrenesulfonate); a polyglycol ether such as nonylphenolpolyglycol ether; an amine such as a quaternary ammonium compound; and other compounds including imidazoline, salts of acrylic acid, pyrophosphate and cetyl pyridinium chloride.

Coatings which can include the opacifying sulfur particle extender of this invention are latexes such as poly(styrene-butadiene), polymethylmethacrylate, vinyl acetate monomer, ethyl acrylate monomer, butyl acrylate monomer, and methyl acrylate monomer. An opacifying extender is added to such a matrix to improve the properties of the matrix, to increase the volume of the matrix and to provide opacity to the matrix without significantly altering its color.

The opacified and extended emulsion and coating compositions of the invention include a coating, which can be a polymer film which remains after the water in a water-borne emulsion has evaporated, having a refractive index in the range of from about 1.2 to about 1.7 or a water-borne emulsion including a polymer component in which colloidal sulfur particles having the characteristics already described are dispersed in an amount in the range of from about 1% to about 40% by volume in the coating. The opacified and extended coatings and polymer compositions of the invention are opacified and increased in volume by the sulfur particles which may also function as a biocide while these compositions remain colorless or have their color substantially unaltered by the presence of the sulfur particles.

Colloidal sulfur is a commercially attractive opacifier and extender because it is abundant, inexpensive and can be produced as a byproduct of petroleum and gas refining. Furthermore, the range of particle diameters over which sulfur particles display peak opacity is substantially broader (0.10–1.0 μm) than that for air bubbles (0.1–0.5 μm). For this reason, less stringent particle diameter control is required for sulfur particles as compared to requirements for air bubble opacifying extenders.

Thus, the present invention is well adapted to carry out the objects and attain the ends and advantages mentioned as well as those inherent therein. While numerous changes may be made by those skilled in the art, such changes are encompassed within the spirit of this invention as defined by the appended claims.

What is claimed is:

1. An opacifying extender for a matrix comprising colloidal sulfur particles wherein the sulfur particles are characterized by a refractive index in the range of from about 1.9 to about 2.4.

2. The opacifying extender of claim 1 wherein the sulfur particles are mainly in the amorphous(γ) phase.

3. The opacifying extender of claim 1 wherein the sulfur particles are further characterized by a particle size which scatters light across the visible spectrum, resulting in an overall colorless appearance of the sulfur particles.

4. The opacifier of claim 3 wherein the sulfur particles range in size from about 0.10 to about 1.50 μm.

5. The opacifying extender of claim 1 wherein the sulfur particles are further characterized to include a biocide to protect the sulfur particles from attack by a biological organism.

6. The opacifying extender of claim 5 wherein the biocide is a transition metal sulfide.

7. The opacifying extender of claim 5 wherein the biocide includes zinc sulfide which protects the sulfur particles from attack by biological organisms and increases the refractive index of the sulfur particles.

8. The opacifying extender of claim 1 wherein the sulfur particles are further characterized to include an anti-oxidant to retard oxidation.

9. The opacifying extender of claim 8 wherein the anti-oxidant is a silica coating.

10. The opacifying extender of claim 1 wherein the sulfur particles are further characterized to include a surfactant to enhance the dispersability of the sulfur particles.

11. The opacifying extender of claim 10 wherein the surfactant is a surfactant selected from the group consisting of ethoxylated compounds, carboxylates, sulfonates and sulfates, polyglycol ethers, amines, salts of acrylic acid, pyrophosphates, and cetyl pyridinium chloride.

* * * * *